US005603473A

United States Patent [19]
Shotey

[11] Patent Number: 5,603,473
[45] Date of Patent: Feb. 18, 1997

[54] COVER PLATE FOR TUBE CONNECTIONS

[76] Inventor: Michael Shotey, 7272 E. Gainey Ranch Rd., #29, Scottsdale, Ariz. 85258

[21] Appl. No.: 445,264

[22] Filed: May 19, 1995

[51] Int. Cl.[6] .......... F16L 3/22

[52] U.S. Cl. .......... 248/68.1; 248/49

[58] Field of Search .......... 248/49, 56, 68.1

[56] References Cited

U.S. PATENT DOCUMENTS

| | | | |
|---|---|---|---|
| 1,822,475 | 9/1931 | Burke | 248/49 |
| 3,135,535 | 6/1964 | Shepard | 248/56 |
| 3,162,412 | 12/1964 | McEntire | 248/56 |
| 3,964,707 | 6/1976 | Lewis | 248/49 |
| 4,366,939 | 1/1983 | McMillan | 248/49 |
| 4,601,447 | 7/1986 | McFarland | 248/49 |
| 4,618,113 | 10/1986 | Reimer | 248/68.1 |
| 4,645,150 | 2/1987 | Taylor | 248/56 |
| 4,844,657 | 7/1989 | Ripley et al. | 248/49 |
| 5,326,060 | 7/1994 | Chubb et al. | 248/56 |
| 5,344,106 | 9/1994 | Beele | 248/56 |

FOREIGN PATENT DOCUMENTS

| | | | |
|---|---|---|---|
| 3534625 | 4/1987 | Germany | 248/56 |

*Primary Examiner*—Leslie A. Braun
*Assistant Examiner*—Richard M. Smith
*Attorney, Agent, or Firm*—Stephen T. Sullivan

[57] ABSTRACT

A cover plate is provided for use with a pesticide distributing system having a plurality of tubes disposed within the structures of a building. This cover plate comprises a front surface, a back surface, and a plurality of apertures extending through the back surface. The back surface includes chamfers on the apertures or the like for connecting the tubing to respective ones of the apertures. The apertures provide fluid communication of the pesticide from the front surface to the tubing. The cover plate may include a mounting device such as hinges disposed at the edge of the cover plate for mounting the cover plate to a building surface, e.g., to the exterior wall of a residence or other building. An enclosure also may be provided for selectively enclosing the front surface.

3 Claims, 2 Drawing Sheets

COVER PLATE FOR TUBE CONNECTIONS

BACKGROUND OF THE INVENTION

This invention relates generally to cover plates for outlets and more particularly to a cover plate for a pesticide tubing junction.

Conventional pest control involves spraying pesticides around the exterior foundation and interior baseboards of homes. Spraying is required periodically to eliminate and control bugs, and homeowners often utilize the services of a professional pest technician who enters the home and charges a fee for each visit. This method of pest control does not allow the chemicals to penetrate interior or exterior wall of homes where bugs flourish. Instead, the chemicals coat the baseboard and floor. Many such pesticides are toxic to humans and pets, and often have an offensive odor. The chemicals may stain flooring, furniture, or clothing.

A preferable method of eliminating pests is to inject pesticides inside the exterior and interior walls. Ideally, tubing for carrying the chemicals is installed during new construction, before the wails are put up. Tubing is run through the framing into each room of the home for chemical dispersion. To dispense chemicals, pesticide is forced through the tubing into the walls where desired, for example around sinks and in bathrooms where bugs flourish. The objective of this invention is to provide a cover plate to gather and secure the ends of tubes.

BRIEF SUMMARY OF THE INVENTION

This invention is a cover plate for gathering and securing pesticide tubes. The cover plate is mounted for easy access and uniform chemical dispersion.

DESCRIPTION OF THE SEVERAL EMBODIMENTS

Figure 1:
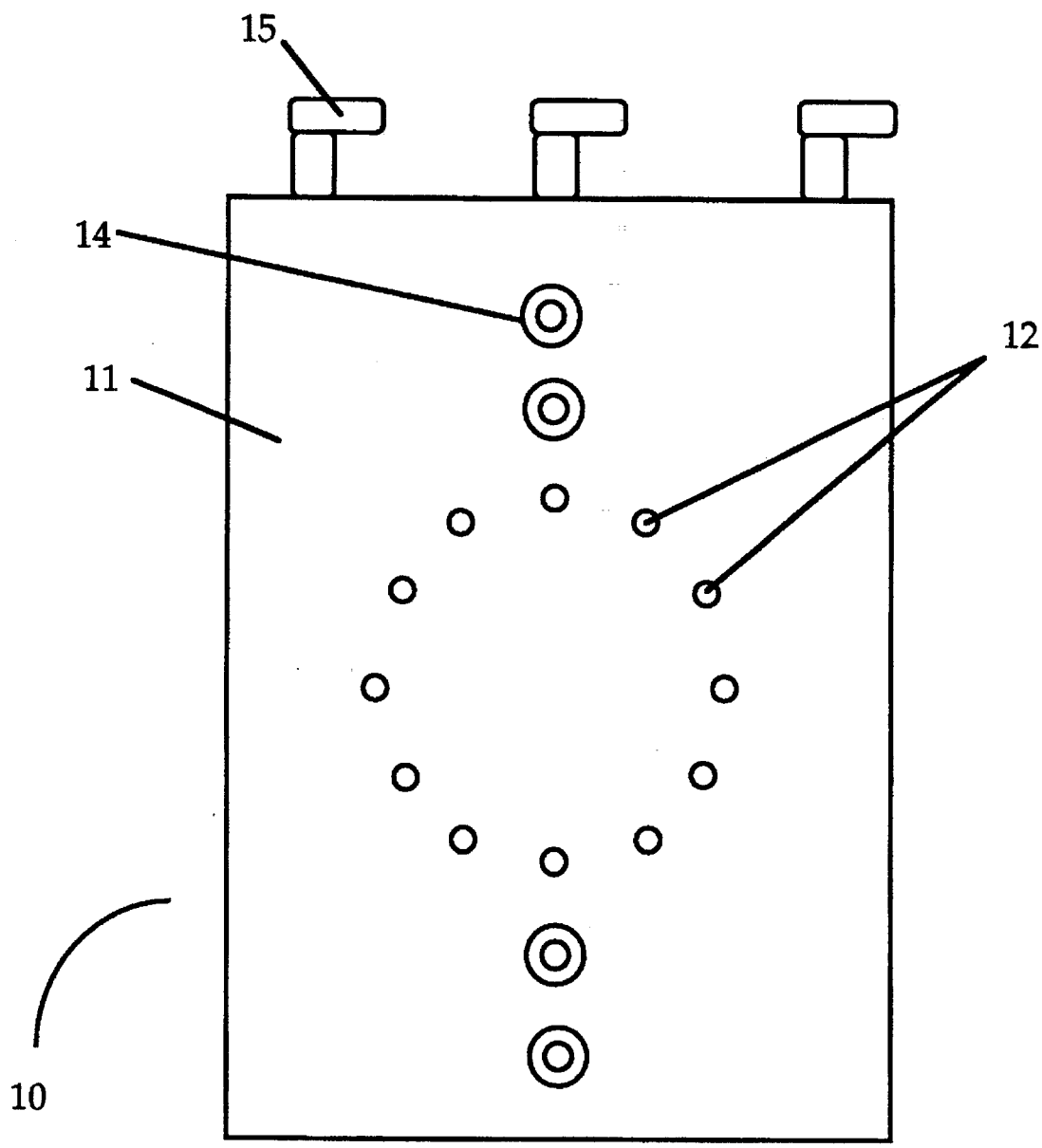
FIG. 1 is a front view of the cover plate.
Figure 2:
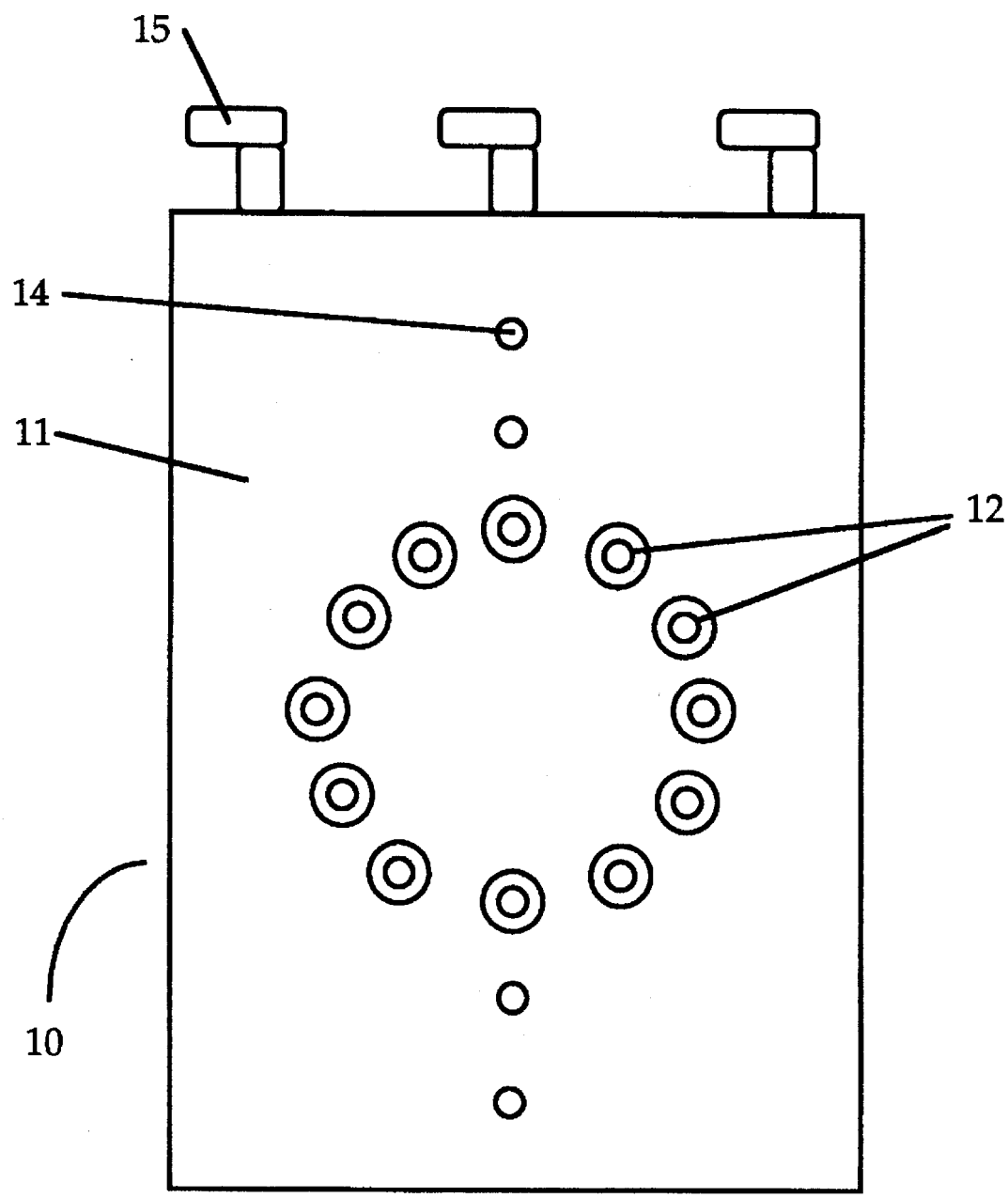
FIG. 2 is a rear view of the cover plate.

Refer to FIG. 1 and 2, where like indicia refer to like parts throughout the drawings. The preferred embodiment of the invention, denoted generally as 10, is seen in front view in FIG. 1. The cover plate 11 has a set of apertures 12 into which tubes are inserted. The apertures may be chamfered, as shown in FIG. 2. Twelve tubes are usually sufficient for a home of approximately 2000 sq. ft. to achieve desired chemical dispersion. The tubes are gathered at an exit juncture in the wall of the home. A single tube is fed through each of the apertures in the cover plate and secured by the coverplate. To disperse pesticide, a cannister or other source of chemicals is attached to the tubes at the cover plate junction. Tubes may be accessed one at a time or in gang fashion with a complementary attachment on the pesticide source. FIG. 2 shows the rear view of the cover plate 11, illustrating the chamfered apertures 12.

The cover plate is mounted in an easily accessible location, preferably the exterior wall of the home. Apertures 14 for mounting the cover plate are shown in FIGS. 1 and 2.

To avoid the tubes being tampered with, the cover plate is preferably housed within a hinged enclosure. FIG. 1 and 2 show hinges 15 for attaching such an enclosure. For increased security, the enclosure may be locked with a key.

Variations and modifications which are in the spirit of this invention and known to those skilled in the art are considered to fall within the scope of this patent.

I claim:

1. A cover plate for use with a pesticide distributing system having a plurality of tubes disposed within the structures of a building, the cover plate comprising: a front surface and a back surface; and a plurality of apertures extending through the cover plate from the back surface to said front surface, each said aperture including chamfer means therein for connecting the tubes to respective ones of the apertures; and the apertures providing fluid communication of the pesticide from the front surface of the cover plate to the tubes.

2. A cover plate as recited in claim 1, furthering including mounting means for mounting the cover plate to a building surface.

3. A cover plate as recited in claim 1, further comprising hinges disposed at an edge of the cover plate.

* * * * *